(12) United States Patent
Takahashi et al.

(10) Patent No.: US 9,381,644 B2
(45) Date of Patent: Jul. 5, 2016

(54) ROBOT

(71) Applicant: KABUSHIKI KAISHA YASKAWA DENKI, Kitakyushu-shi (JP)

(72) Inventors: Shingi Takahashi, Kitakyushu (JP); Tomoyuki Shiraki, Kitakyushu (JP); Masato Ito, Kitakyushu (JP); Kaori Sakaki, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/446,304

(22) Filed: Jul. 29, 2014

(65) Prior Publication Data

US 2015/0039125 A1 Feb. 5, 2015

(30) Foreign Application Priority Data

Jul. 30, 2013 (JP) .................................. 2013-158209

(51) Int. Cl.
*B25J 17/00* (2006.01)
*B25J 17/02* (2006.01)
(Continued)

(52) U.S. Cl.
CPC ............ *B25J 9/1628* (2013.01); *B25J 19/0008* (2013.01); *B25J 19/0025* (2013.01); *Y10S 901/14* (2013.01); *Y10S 901/42* (2013.01)

(58) Field of Classification Search
CPC .......... B25J 9/14; B25J 9/104; B25J 15/0233; B25J 15/0286; B25J 15/0213; B25J 19/0008; B25J 19/0012; B25J 19/0029; B25J 19/0041; B25K 11/317; B25K 11/318
USPC ............... 74/490.01–490.03, 490.05, 490.06; 901/15, 23, 25, 26, 41, 42, 48; 219/86.31, 86.61, 86.51, 121.78, 219/124.33
See application file for complete search history.

(56) References Cited

U.S. PATENT DOCUMENTS

| 5,606,235 A * | 2/1997 | Mauletti | ................. B25J 9/046 318/12 |
| 7,703,349 B2 * | 4/2010 | Nihei | ..................... B25J 13/085 174/350 |

(Continued)

FOREIGN PATENT DOCUMENTS

| CA | 2217224 | 10/1996 |
| CN | 102452079 | 5/2012 |

(Continued)

OTHER PUBLICATIONS

Japanese Office Action for corresponding JP Application No. 2013-158209, May 19, 2015.

(Continued)

*Primary Examiner* — William Kelleher
*Assistant Examiner* — Jake Cook
(74) *Attorney, Agent, or Firm* — Mori & Ward, LLP

(57) ABSTRACT

A robot includes: a stage unit; a rotation base connected to the stage unit in a rotatable manner around a predetermined rotating axis; an arm unit connected to the rotation base and having a base end rotatable around a first rotation axis that is substantially orthogonal to the rotating axis; a first attachment unit provided to the rotation base, arranged in an outside, in a rotation radius direction, of the rotation base and nearer to the stage unit than the first rotation axis, and formed so that one part of a balancer is attached thereto; and a second attachment unit provided to the arm unit and formed so that another part of the balancer is attached thereto.

16 Claims, 7 Drawing Sheets

(51) Int. Cl.
   *B25J 18/00* (2006.01)
   *B25J 9/16* (2006.01)
   *B25J 19/00* (2006.01)

(56) References Cited

U.S. PATENT DOCUMENTS

| | | | |
|---|---|---|---|
| 8,006,586 B2* | 8/2011 | Tealdi | B25J 9/102 |
| | | | 74/490.02 |
| 2004/0093975 A1* | 5/2004 | Amparore | B25J 19/0008 |
| | | | 74/490.01 |
| 2004/0261563 A1* | 12/2004 | Inoue | B25J 19/0025 |
| | | | 74/490.03 |
| 2005/0011295 A1 | 1/2005 | Shiraki et al. | |
| 2008/0236324 A1* | 10/2008 | Inoue | B25J 9/046 |
| | | | 74/490.02 |
| 2009/0114053 A1* | 5/2009 | Mikaelsson | B25J 9/0009 |
| | | | 74/490.05 |
| 2009/0314120 A1* | 12/2009 | Larsson | B25J 19/0029 |
| | | | 74/490.02 |
| 2010/0043587 A1* | 2/2010 | Broberg | B25J 19/0016 |
| | | | 74/490.01 |
| 2012/0103125 A1 | 5/2012 | Liu | |
| 2012/0186379 A1 | 7/2012 | Miyamoto | |

FOREIGN PATENT DOCUMENTS

| | | |
|---|---|---|
| EP | 0819041 | 1/1998 |
| JP | 02-066987 U | 5/1990 |
| JP | 03-130387 U | 12/1991 |
| JP | 05-138581 | 6/1993 |
| JP | 09-150393 | 6/1997 |
| JP | 2003-136462 | 5/2003 |
| JP | 2005-288560 | 10/2005 |
| JP | 2011-200989 | 10/2011 |
| JP | 2012-148392 | 8/2012 |

OTHER PUBLICATIONS

Chinese Office Action for corresponding CN Application No. 201410366331.7, Aug. 4, 2015.

Japanese Office Action for corresponding JP Application No. 2013-158209, Oct. 27, 2015.

Extended European Search Report for corresponding EP Application No. 14179090.7-1712, Mar. 30, 2016.

Chinese Office Action for corresponding CN Application No. 201410366331.7, Mar. 7, 2016.

* cited by examiner

ROBOT

CROSS-REFERENCE TO RELATED APPLICATION

This application claims priority from Japanese Patent Application No. 2013-158209 filed with the Japan Patent Office on Jul. 30, 2013, the entire content of which is hereby incorporated by reference.

BACKGROUND

1. Technical Field

The disclosed embodiments relate to a robot.

2. Related Art

JP-A-2011-200989 discloses robots used for a spot welding. Such robots have a rotation base and a multi-axis arm, for example. The rotation base is provided in a rotatable manner with respect to a stage unit fixed on a floor. The multi-axis arm is attached to the rotation stage.

SUMMARY

A robot includes: a stage unit; a rotation base connected to the stage unit in a rotatable manner around a predetermined rotating axis; an arm unit connected to the rotation base and having a base end rotatable around a first rotation axis that is substantially orthogonal to the rotating axis; a first attachment unit provided to the rotation base, arranged in an outside, in a rotation radius direction, of the rotation base and nearer to the stage unit than the first rotation axis, and formed so that one part of a balancer is attached thereto; and a second attachment unit provided to the arm unit and formed so that another part of the balancer is attached thereto.

DETAILED DESCRIPTION

Figure 1:
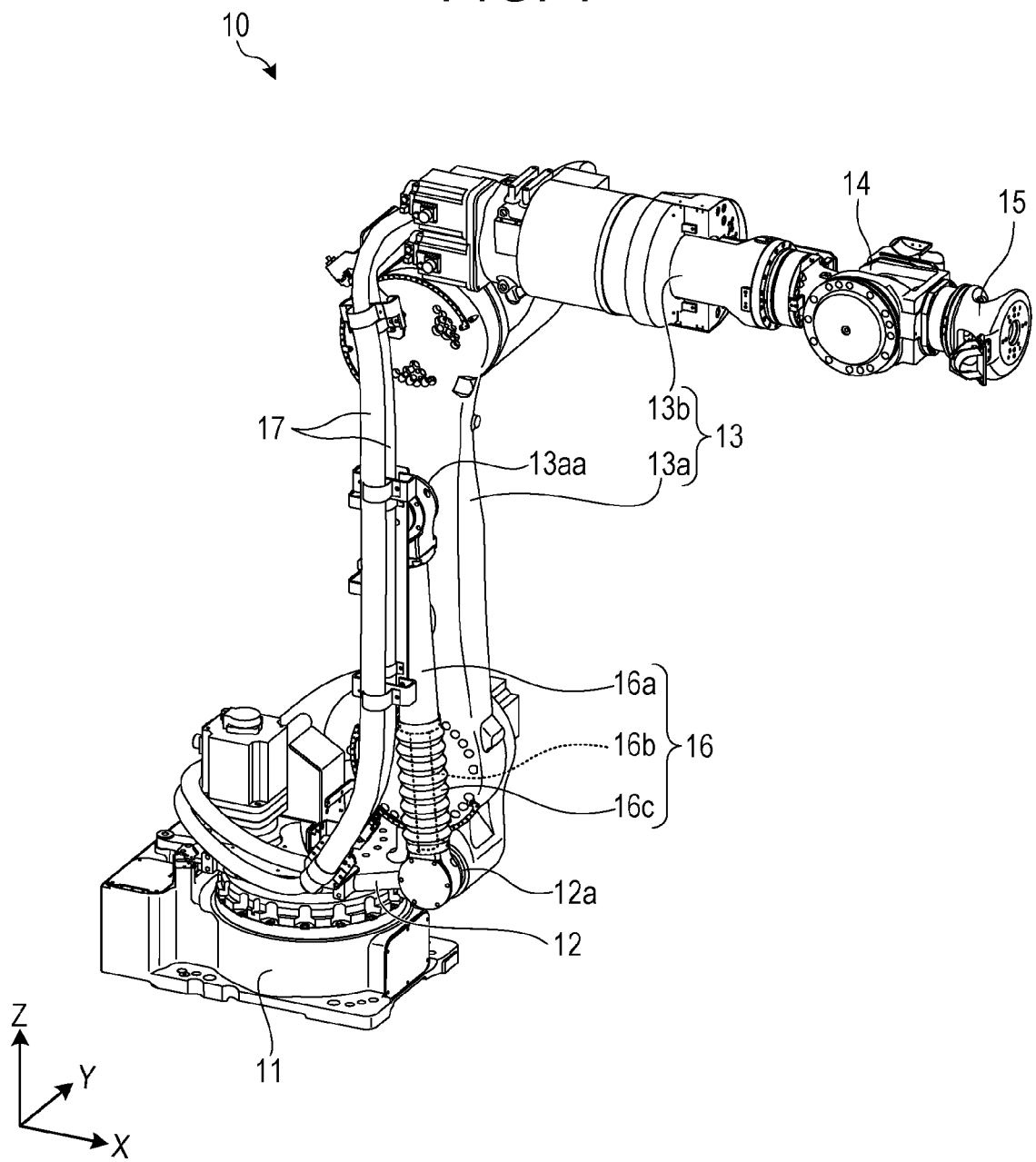
FIG. 1 is a perspective view of a robot according to an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A robot according to one form of an embodiment has a stage unit, a rotation base, an arm unit, a first attachment unit, and a second attachment unit. The rotation base is connected to the stage unit in a rotatable manner around a predetermined rotating axis. The arm unit is connected to the rotation base so that the base end of the arm unit is rotatable around the first rotation axis that is substantially orthogonal to the rotating axis. The first attachment unit is provided to the rotation base and arranged in the outside, in the rotation radius direction, of the rotation base and nearer to the stage unit than the first rotation axis. The first attachment unit is formed so that one part of a balancer is attached thereto. The second attachment unit is provided to the arm unit. The second attachment unit is formed so that another part of the balancer is attached thereto.

One form of the embodiments allows for space saving.

By referring to the attached drawings, described in detail below will be the embodiments of a robot disclosed by the present application. It is noted that the scope of the disclosure is not limited by the following embodiments.

In the followings, the description will be provided by exemplifying a robot used for spot welding.

Firstly, the general configuration of a robot 10 according to the embodiment will be described. FIG. 1 is a perspective view of the robot 10 according to the embodiment. It is noted that, in the followings, a positional relationship among respective units of the robot 10 will be described assuming that the rotation position and attitude of the robot 10 is basically in a state as depicted in FIG. 1 for the purpose of description.

Further, for the better understanding of the description, FIG. 1 depicts a three-dimensional orthogonal coordinate system including the Z axis whose positive direction is the perpendicularly upper direction. Such orthogonal coordinate system may also be applied to other drawings used for the following description. It is noted that, in the present embodiment, the positive direction of the X axis indicates the front direction of the robot 10.

As illustrated in FIG. 1, the robot 10 is of so-called vertical multi joint type. Specifically, the robot 10 has a stage unit 11, a rotation base 12, an arm unit 13, a wrist unit 14, and a flange unit 15. The wrist unit 14 is an example of a swing unit.

Further, the arm unit 13 has a lower arm 13a and an upper arm 13b. The lower arm 13a is an example of a first arm. Also, the upper arm 13b is an example of a second arm.

The stage unit 11 is a support base fixed on a floor. The rotation base 12 is provided to the stage unit 11 in a rotatable manner. The lower arm 13a is provided to the rotation base 12 in a rotatable manner.

The upper arm 13b is provided to the lower arm 13a in a rotatable manner. The wrist unit 14 is provided to the tip end of the upper arm 13b in a swingable manner. Further, the flange unit 15 is provided to the wrist unit 14 in a rotatable manner. In addition, an end effector such as a spot welding gun can be attached to the flange unit 15.

Further, the robot 10 has a balancer 16 for weight compensation. The balancer 16 has a cylinder unit 16a that is filled with fluid such as nitrogen gas, and a rod unit 16b that is expanded and contracted by a pressure of the fluid. It is noted that other gas or liquid such as oil may be used for the fluid in the cylinder unit 16a.

The balancer 16 is connected to the rotation base 12 and the lower arm 13a via a first attachment unit 12a provided to the rotation base 12 and a second attachment unit 13aa provided to the lower arm 13a, respectively.

It is noted that, at the rod unit 16b of the balancer 16, a rod having a smaller radius than the cylinder unit 16a is covered with a bellows-like cover member 16c. The cover member 16c is expanded and contracted according to the expansion and contraction of the rod. As such, it is effective to cover the rod with the cover member 16c, because the burning by a heated piece such as a spatter is suppressed when the robot 10 is used for the welding. It is noted that the shape of the cover member 16c is not always required to be bellows-shaped but may be any shape that covers the rod unit 16b in a cylindrical manner.

Further, the robot 10 has a cable 17. The cable 17 is some of cables and/or hoses and the like equipped for the welding. The cable 17 is routed along the lower arm 13a outside the balancer 16 while supported by the above-described balancer 16.

Further, the cable 17 is routed with respect to the upper arm 13b so as to round the outside of the base end of the upper arm 13b and be directed to the tip end of the upper arm 13b.

The robot 10 of the present embodiment is to achieve the space saving in the above-described configuration. The robot 10 then enables the rotation base 12, the arm unit 13, and the wrist unit 14 to operate without being affected by undesirable restriction by the cable 17. The robot 10 performs handling operation such as spot welding operation by controlling the position and attitude of the end effector attached to the wrist unit 14.

Figure 2A:
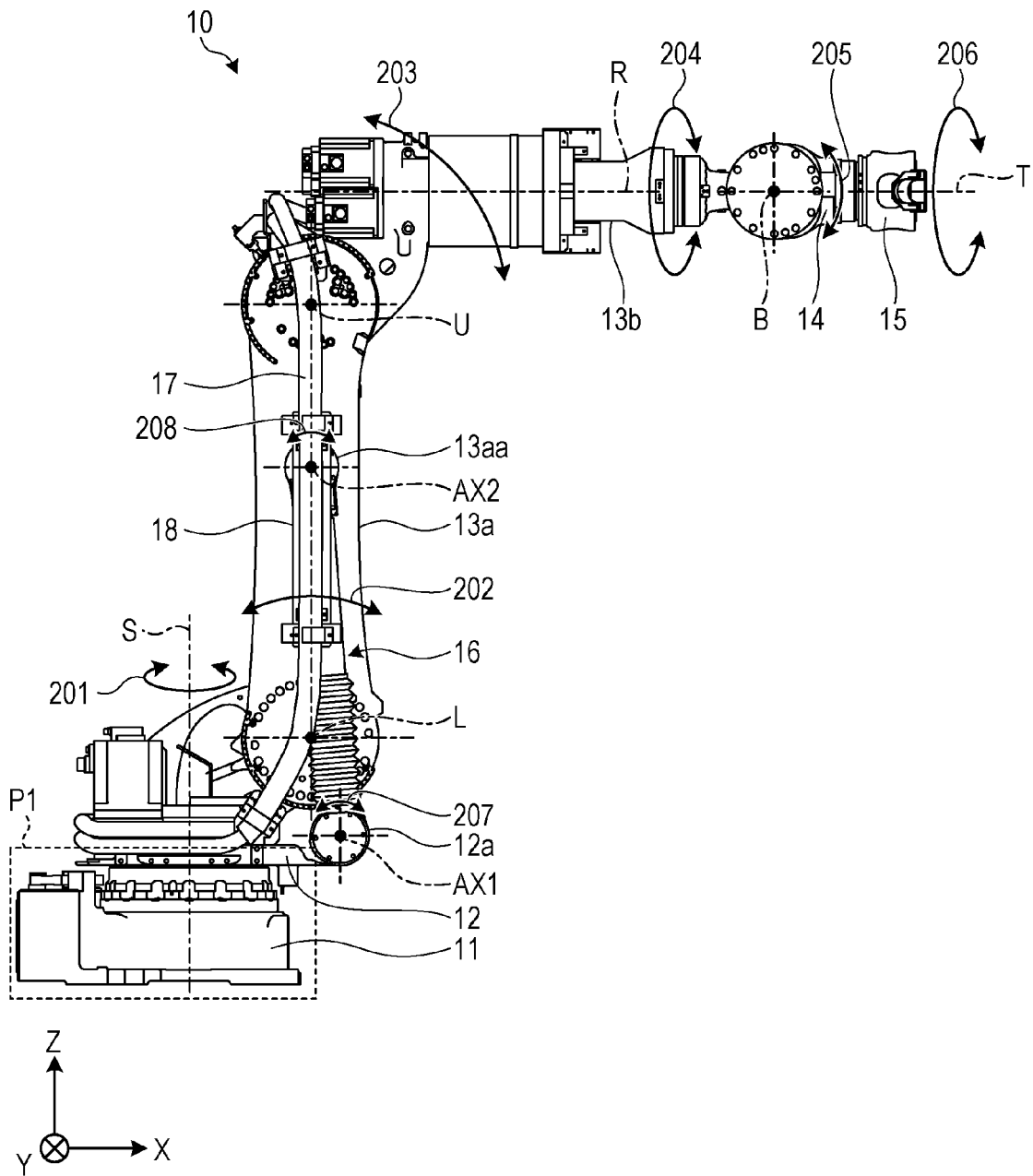
FIG. 2A is a left side view of a configuration of the robot according to the embodiment.

The configuration of the robot 10 will be described below in further detail by using FIG. 2A and subsequent drawings. FIG. 2A is a left side view of the configuration of the robot 10 according to the embodiment.

As illustrated in FIG. 2A, the rotation base 12 is connected to the stage unit 11 in a rotatable manner around the rotating axis S (see the arrow 201 in the figure). It is noted that, in the coupling portion of the stage unit 11 and the rotation base 12, the cable 17 is routed so as to achieve the space saving. The details of this point will be described later by using the transparent views (FIG. 4A and FIG. 4B) of a P1 part depicted in the figures.

Further, as illustrated in FIG. 2A, the lower arm 13a is connected to the rotation base 12 so that the base end of the lower arm 13a is rotatable around an axis L that is substantially orthogonal to the rotating axis S (see the arrow 202 in the figure). The axis L is an example of a first rotation axis.

Further, the upper arm 13b is connected to the tip end of the lower arm 13a so that the base end of the upper arm 13b is rotatable around an axis U that is substantially parallel to the axis L (see the arrow 203 in the figure). It is noted that the upper arm 13b operates so as to extend more forward than the lower arm 13a at the rotation position of the origin (see the rotation center of the axis U). The axis U is an example of a second rotation axis.

In addition, the upper arm 13b is provided so as to be able to twist around an axis R that is substantially orthogonal to the axis U (see the arrow 204 in the figure).

Further, the wrist unit 14 is connected to the tip end of the upper arm 13b swingable (or rotatable) around an axis B that is substantially orthogonal to the axis R (see the arrow 205 in the figure). Further, the flange unit 15 is connected to the wrist unit 14 in a rotatable manner around an axis T that is substantially orthogonal to the axis B (see the arrow 206 in the figure). It is noted that the axis B is a rotation axis that is substantially parallel to the axis L. The axis B is an example of a third rotation axis. The axis T is an example of a fourth rotation axis.

In addition, the flange unit 15 is provided with an end effector attachment unit 15b (described later) enabling the attachment of the end effector. The details of the flange unit 15 will be described later by using FIG. 5A and FIG. 5B.

Further, in the balancer 16 as illustrated in FIG. 2A, the base end of the balancer 16 is attached to the first attachment unit 12a, while the tip end of the balancer 16 is attached to the second attachment unit 13aa. That is, the balancer 16 is connected to both the rotation base 12 and the lower arm 13a.

Further, the balancer 16 is attached to the first attachment unit 12a in a rotatable manner around an axis AX1 that is substantially parallel to the axis L (see the arrow 207 in the figure). Further, the balancer 16 is attached to the second attachment unit 13aa in a rotatable manner around an axis AX2 that is substantially parallel to the axis L (see the arrow 208 in the figure). It is noted that the axis AX1 is an example of a first support axis and the axis AX2 is an example of a second support axis.

Here, as illustrated in FIG. 2A, the first attachment unit 12a is arranged in the outside, in the rotation radius direction, of the main part of the rotation base 12 and nearer to the stage unit 11 than the axis L. That is, the first attachment unit 12a is formed so that the base end of the balancer 16 is able to be attached in more front of the robot 10 than the rotation base 12.

Figure 2B:
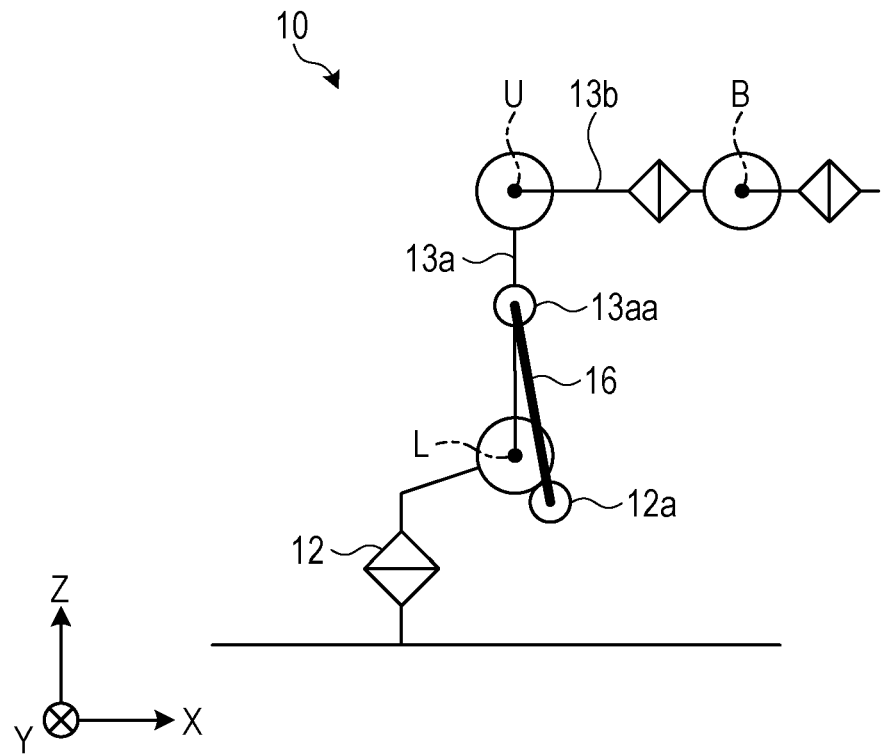
FIG. 2B is a schematic diagram of an advantages allowed by a balancer according to the embodiment.
Figure 2B:
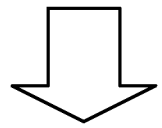
Figure 2B:
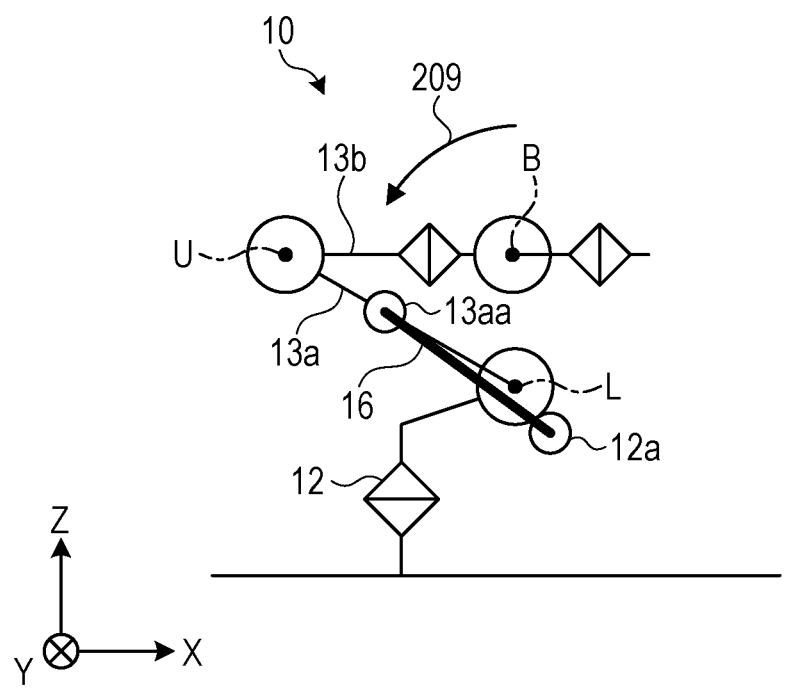

Described will be the advantages allowed by the balancer 16 attached in this way. FIG. 2B is a schematic diagram of the advantages allowed by the balancer 16 according to the embodiment. It is noted that, in FIG. 2B, the upper figure illustrates the robot 10 in a state where the lower arm 13a is elected and the lower figure illustrates the robot 10 in a state where the lower arm 13a is collapsed rearward. In these figures, the robot 10 is depicted in a quite schematic manner using graphic symbols that indicate the joints.

As illustrated in FIG. 2B, the base end of the balancer 16 is arranged via the first attachment unit 12a in more front of the robot 10 than the rotation base 12. This allows the lower arm 13a to be collapsed rearward in a wider range (see the arrow 209 in the figure). This is because the force supporting upward the lower arm 13a that is being collapsed rearward is applied by the balancer 16.

This allows for improved flexibility in the attitude that the robot 10 is able to take in the spot welding operation. Further, it allows the robot 10 to take a more compact attitude in the conveyance of the robot 10, that is, which allows the robot 10 to be collapsed in a more compact manner. Therefore, the volume at the conveyance can be reduced.

Further, the attachment of the balancer 16 in the above manner is unlikely to cause the increased footprint, compared to the case where the conventional spring type balancer is attached. That is, the footprint is narrowed, so that the space saving can be achieved.

Turning back to the description of FIG. 2A, the cable 17 is routed to the upper part of the rotation base 12 from the coupling portion of the stage unit 11 and the rotation base 12 as illustrated in FIG. 2A. Furthermore, the cable 17 is routed along the lower aim 13a outside the balancer 16 while supported by the balancer 16.

That is, the cable 17 is routed while supported by the balancer 16 that reduces the footprint as described above. Therefore, again, the space saving can be achieved.

It is noted that the robot 10 further has a stay 18. The stay 18 is provided along the balancer 16. The stay 18 is fixed at two points to the cylinder unit 16a by a support member. The cable 17 is supported by the balancer 16 by being fixed to the tip end of the balancer 16 via the stay 18. The stay 18 is an example of a support member.

Further, the cable 17 is routed with respect to the upper arm 13b so as to round the outside of the base end of the upper arm 13b and be directed to the tip end of the upper arm 13b.

Thereby, the cable 17 is unlikely to be caught between the upper arm 13b and the lower arm 13a. This allows the robot 10 to operate without being undesirably restricted by the cable 17.

This feature is useful in the spot welding in which the cable 17 tends to be bulky with cables and/or hoses equipped for the welding.

Figure 3A:
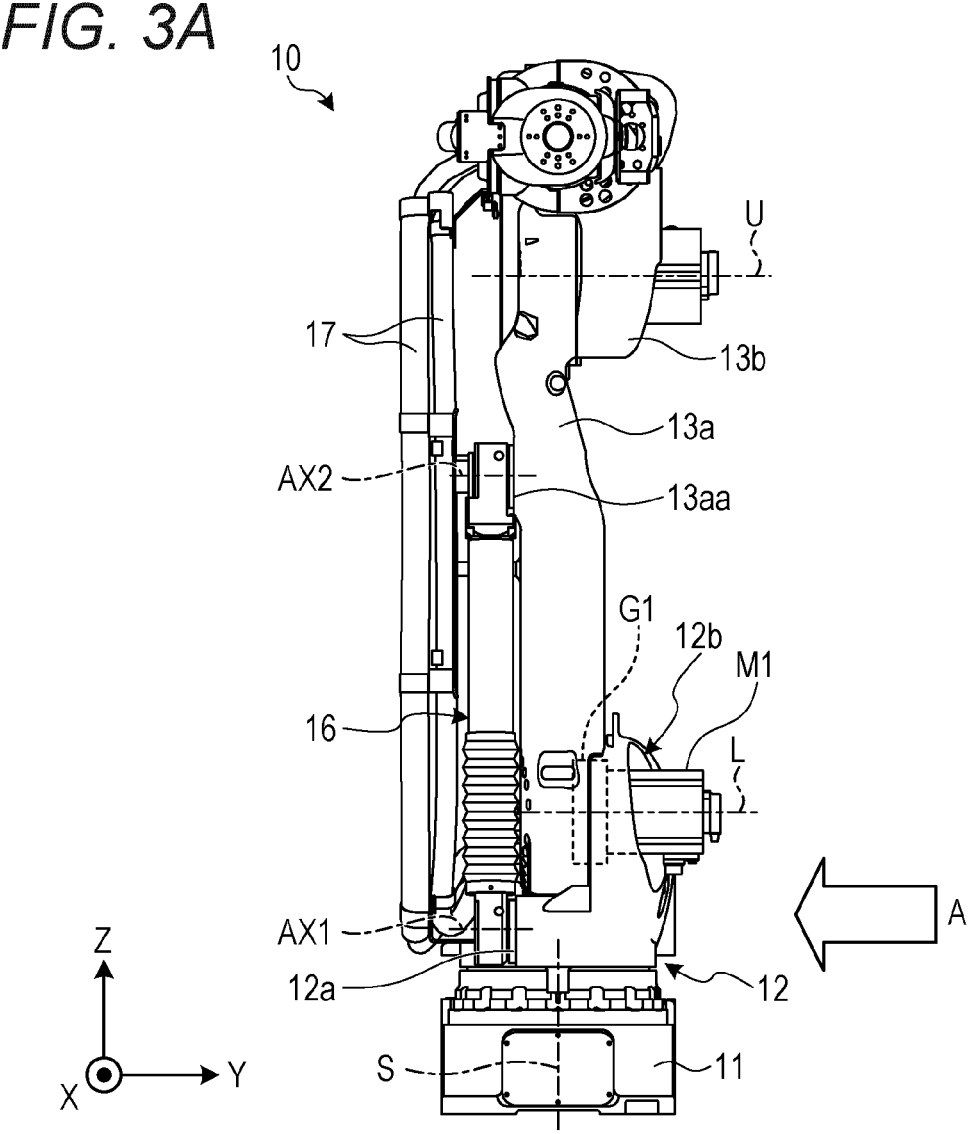
FIG. 3A is a front view of the robot according to the embodiment.
Figure 3B:
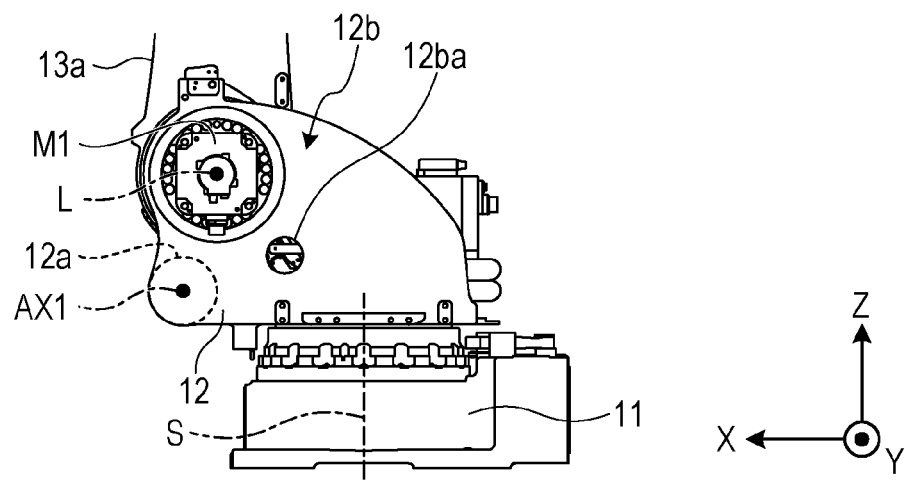
FIG. 3B is a view around a rotation base viewed from an arrow A indicated in FIG. 3A.

Next, the configuration around the rotation base 12 will be described in further details. FIG. 3A is a front view of the robot 10 according to the embodiment. Further, FIG. 3B is a view around the rotation base 12 viewed from the arrow A illustrated in FIG. 3A.

As illustrated in FIG. 3A, the robot 10 further has a servo motor M1 and a reduction gear G1. The servo motor M1 applies, to the lower arm 13a, a rotary driving force for rotating the lower arm 13a around the axis L. The reduction gear G1 is connected to the servo motor M1 so as to be able to transfer the motive power.

The rotation base 12 has a connection unit 12b. The connection unit 12b accommodates the reduction gear G1 so that it is connected to the lower arm 13a in a rotatable manner. Thus, the connection unit 12b also supports the servo motor M1 connected to the reduction gear G1.

It is noted that the rotation base 12 is a cast metal. The connection unit 12b is integrally formed with the rotation base 12.

Further, under the lower arm 13a, the above-described first attachment unit 12a extends from the lower part of the connection unit 12b in substantially parallel to the axis L. The first attachment unit 12a is connected to the base end of the balancer 16 in more extending direction side (in the Y axis negative side in the figure) than the lower arm 13a. The first attachment unit 12a is also integrally formed with the rotation base 12.

Further, as illustrated in FIG. 3B, the connection unit 12b is provided with a hole 12ba. Into the hole 12ba, a cable 19 (described later) connected to the servo motor M1 is inserted.

Figure 4A:
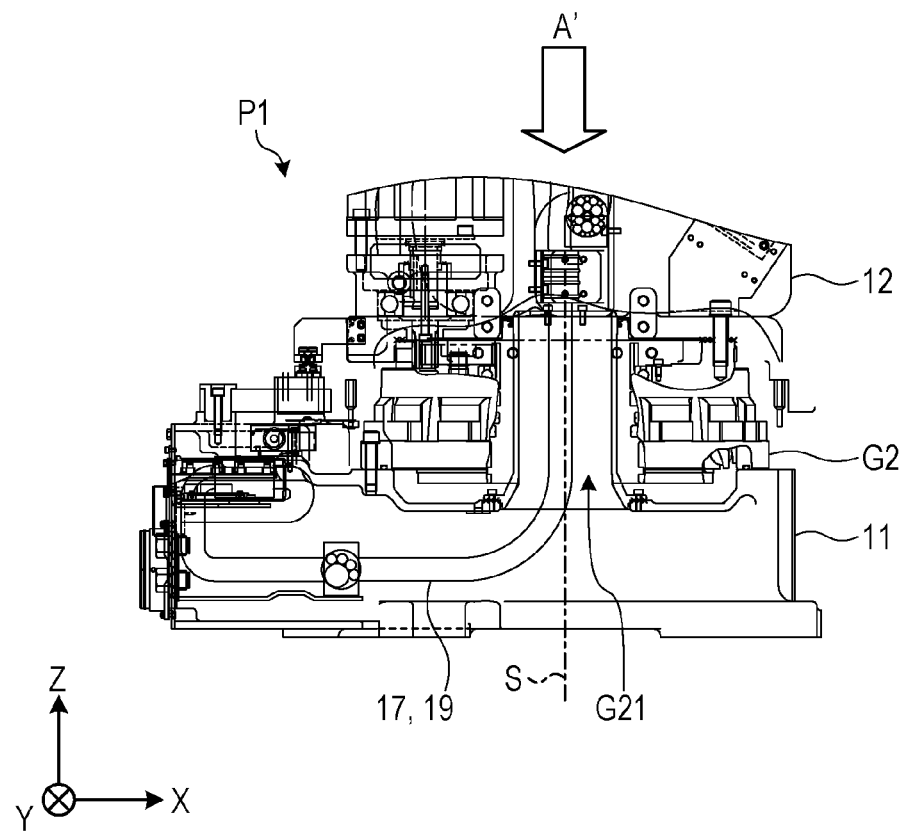
FIG. 4A is a transparent view around a P1 part indicated in FIG. 2A.

Next, the routing of the cables including the cable 19 and the above-described cable 17 will be described by using FIG. 4A to FIG. 4C. FIG. 4A is a transparent view around the P1 part indicated in FIG. 2A, FIG. 4B is a transparent view of the P1 part viewed from the arrow A' indicated in FIG. 4A, and FIG. 4C is a plane view of the robot 10 according to the embodiment.

As illustrated in FIG. 4A, the stage unit 11 and the rotation base 12 are connected via a hollow reduction gear G2 having a hollow hole G21 along the rotating axis S. The hollow reduction gear G2 is an example of a rotation member.

Here, the cable 17 and the cable 19 are first routed from the outside of the robot 10 to the hollow hole G21. Here, these cables are routed without being arranged around the rotating axis S (without being subjected to the U-shape motion bent process and the like) inside the stage unit 11.

Figure 4B:
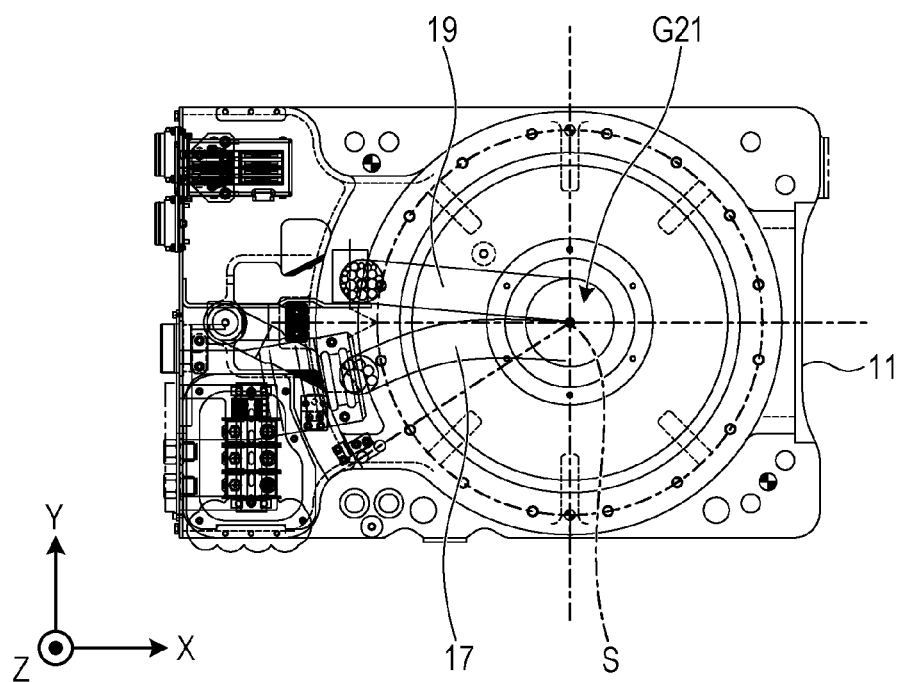
FIG. 4B is a transparent view of the P1 part viewed from an arrow A' indicated in FIG. 4A.
Figure 4C:
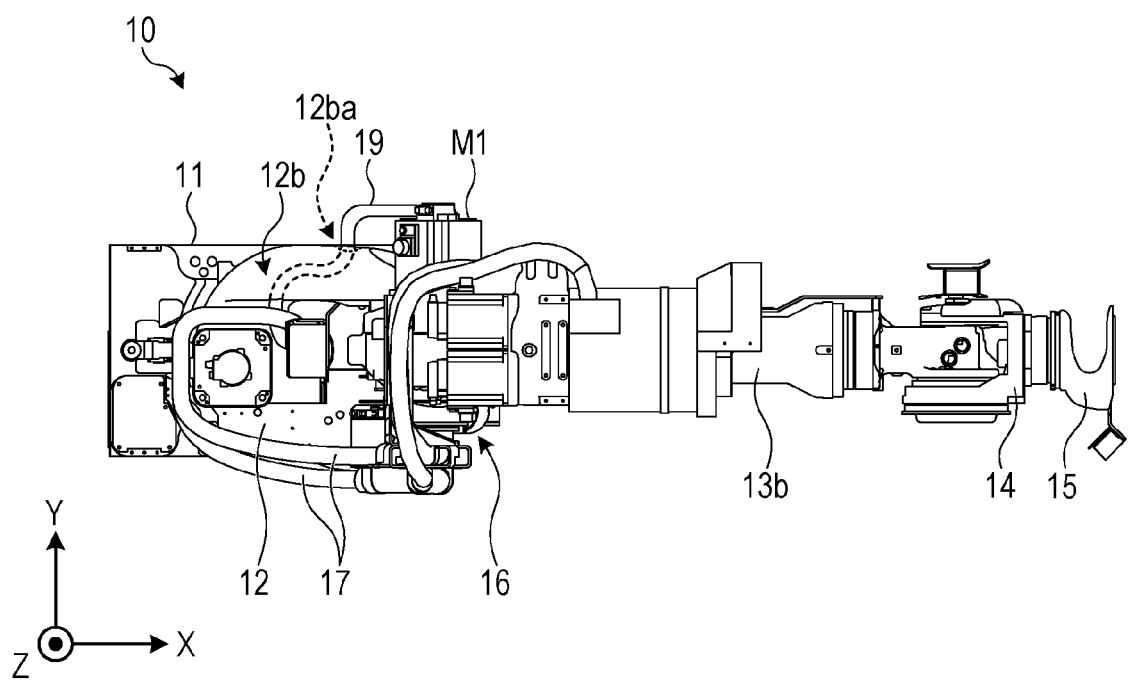
FIG. 4C is a plane view of the robot according to the embodiment.

As illustrated in FIG. 4B, the cable 17 and the cable 19 are then subjected to the twist process in the hollow hole G21. Therefore, according to the robot 10 of the present embodiment, it can be suppressed that the stage unit 11 would otherwise become undesirably large due to the cables arranged therearound.

Therefore, the footprint of the robot 10 can be narrowed and the cables can be arranged in a high density. That is, the space saving can be achieved.

It is noted that the cables twisted inside the hollow hole G21 is routed through the hollow hole G21 and from the stage unit 11 to the upper part of the rotation base 12, as illustrated in FIG. 4C. Furthermore, the cables are branched at the upper part of the rotation base 12.

One of the branched cables 19 is connected to the servo motor M1 through the hole 12ba of the connection unit 12b. Further, the other branched cable 17 is gathered with another cable 17. These cables 17 are routed around the peripheral of the servo motor M1 and along the stay 18.

Figure 5A:
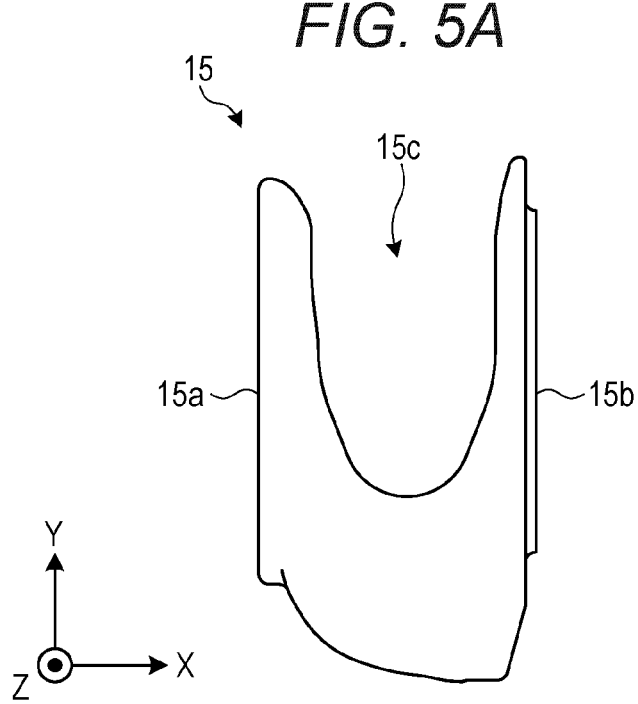
FIG. 5A is a plane view of a flange unit.

Next, the details of the flange unit 15 will be described by using FIG. 5A and FIG. 5B. FIG. 5A is a plane view of the flange unit 15, and FIG. 5B is a schematic diagram of a use state of the flange unit 15.

As illustrated in FIG. 5A, the flange unit 15 is formed in substantially a U-shape in a plane view. The flange unit 15 has a part to be attached 15a, an end effector attachment unit 15b, and an opening 15c.

It is noted that the bottom of the flange unit 15 opposing to the opening 15c is also opened though its depiction is omitted in FIG. 5A.

Figure 5B:
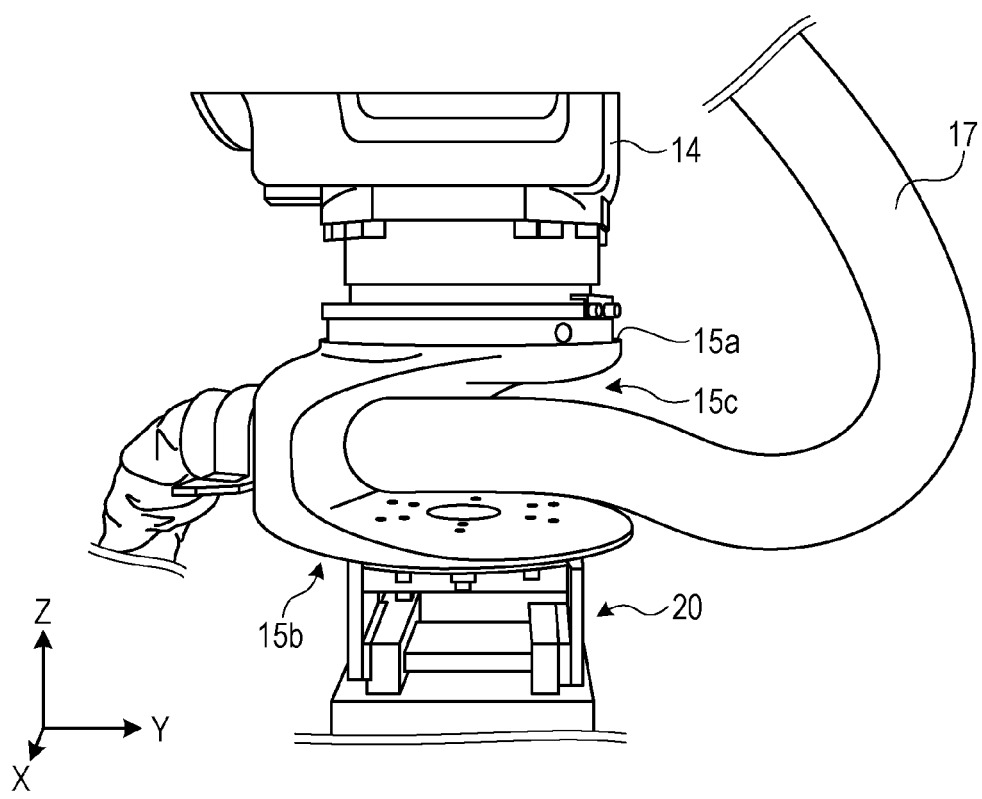
FIG. 5B is a schematic diagram of a use state of the flange unit.

The flange unit 15 is attached to the wrist unit 14 by the part to be attached 15a, as illustrated in FIG. 5B. Further, to the end effector attachment unit 15b, a spot welding gun 20 is attached, for example, as an end effector. Thereby, the wrist unit 14 and the spot welding gun 20 are jointed via the flange unit 15.

Further, as described above, the cable 17 is routed along the upper arm 13b from the lower arm 13a. The cable 17 is inserted into the bottom side of the flange unit 15 from the U-shaped opening 15c side of the flange unit 15 and then connected to the spot welding gun 20.

Then, the cable 17 is held by the flange unit 15 with spatial room. This allows the cable 17 to move in a high flexibility in the space within the flange unit 15 even when the spot welding gun 20 is rotated in response to the rotation of the wrist unit 14.

That is, even when the cables 17 are the cables equipped for the welding that are likely to be bulky, the cables 17 can be gathered in a compact manner, and the high flexibility in the operation of the cables 17 can be maintained. This allows the robot 10 to perform the spot welding operation without being affected by the undesirable restriction (such as the interference) in the operation.

As has been described above, the robot according to the present embodiment has the stage unit, the rotation base, the arm unit, the first attachment unit, and the second attachment unit. The rotation base is connected to the stage unit in a rotatable manner around a predetermined rotating axis. The arm unit is connected to the rotation base so that the base end of the arm unit is rotatable around the first rotation axis that is substantially orthogonal to the rotating axis.

The first attachment unit is provided to the rotation base, and arranged in the outside, in the rotation radius direction, of the rotation base and nearer to the stage unit side than the first rotation axis. One part of the balancer is attached to the first attachment unit. The arm unit is provided to the second attachment unit. Another part of the balancer is attached to the second attachment unit.

Therefore, the robot of the embodiment allows for the space saving.

It is noted that, in the embodiment described above, the example in which the robot is used for the spot welding has been described. However, the type of the operation performed by the robot is not limited to the spot welding. That is, for example, a hand that is able to hold a work may be attached as the end effector in place of the spot welding gun. In this case, the robot can be used for the handling operation of the work.

Further, in the embodiment described above, the example in which the balancer is held at its base end and tip end has been described. However, the supported portion of the balancer is not limited to them. That is, the balancer may be supported its one part and another part, or at least two points.

Further, in the embodiment described above, the multi-axis robot having six axes has been exemplified. However, the number of axes of the robot is not limited to it. The robot may be the multi-axis robot having seven axes, for example.

Further, in the embodiment described above, the robot with a single arm has been exemplified. Without limited to it, however, the above-described embodiment may be applied to at least any one of the arms of the multi-arm robot having two or more arms.

Further advantages and/or modifications can be readily derived by those skilled in the art. Thus, broader forms of the technique of the present disclosure are not limited to the specific details and the exemplary embodiments that have been illustrated and described above. Therefore, various modifications are possible without departing from the spirit and scope of the encompassing concept of the technique of the present disclosure defined by the appended claims and their equivalents.

Further, the robot according to one embodiment of the present disclosure may be the following first to thirteenth robots. The first robot has a stage unit; a rotation base connected to the stage unit in a rotatable manner around a predetermined rotating axis; an arm unit having a base end connected to the rotation base in a rotatable manner around a rotation axis that is substantially orthogonal to the rotating axis; a first attachment unit provided to the rotation base, arranged in an outside, in a rotation radius direction, of the rotation base and nearer to the stage unit than the rotation axis, and attached with one part of the balancer; and a second attachment unit provided to the arm unit and attached with another part of the balancer.

In the second robot according to the first robot, the arm unit has a first arm having a base end connected to the rotation base and a second arm provided to a tip end of the first arm in a rotatable manner around a rotation axis that is substantially parallel to the rotation axis and extending in more forward than the first arm at a rotation position of an origin, and the first attachment unit is formed so that the base end of the balancer can be attached thereto in more forward than the rotation base.

The third robot according to the first or second robot further has the balancer, the base end of the balancer is attached to the first attachment unit in a rotatable manner around a first support axis that is substantially parallel to the rotation axis, and the tip end of the balancer is attached to the second attachment unit in a rotatable manner around a second support axis that is substantially parallel to the rotation axis.

The fourth robot according to the second or third robot further has a swing unit connected to the second arm in a rotatable manner around a rotation axis that is substantially parallel to the rotation axis, a flange unit rotatable around a rotation axis that is substantially orthogonal to the rotation axis of the swing unit, and an end effector attachment unit provided to the flange unit and enabling attachment of an end effector.

In the fifth robot according to the fourth robot, the end effector is a spot welding gun.

In the sixth robot according to any one of the first to fifth robots, the balancer has a cylinder unit filled with fluid and a rod unit expanded and contracted by a pressure of the fluid.

In the seventh robot according to any one of the first to sixth robots, the rotation base is formed with a connection unit for accommodating a reduction gear to be connected to the arm unit in a rotatable manner and the first attachment unit is formed so as to extend, under the arm unit, from the lower part of the connection unit in substantially parallel to the rotation axis of the arm unit and be connected to the base end of the balancer in more extending direction side than the arm unit.

In the eighth robot according to the seventh robot, a servo motor adapted to apply a rotary driving force of the arm unit is supported at the connection unit and connected to the reduction gear accommodated in the connection unit so as to be able to transfer motive power to the reduction gear.

In the ninth robot according to the eighth robot, a hole into which a cable to be connected to the servo motor is inserted is provided to the connection unit.

In the tenth robot according to the ninth robot, the stage unit and the rotation base are connected via a rotation member having a hollow hole along the rotating axis, the cable is routed through the hollow hole and from the stage unit to the upper part of the rotation base and branched at the upper part of the rotation base, one of the branched cables is connected to the servo motor through the hole of the connection unit, and the other cable is gathered with another cable and routed along the balancer.

In the eleventh robot according to the tenth robot, the other cable is arranged along the arm unit outside the balancer from the hollow hole while supported by the balancer.

The twelfth robot according to the tenth or eleventh robot further has a support member, and the other cable is supported by the balancer by being fixed to the tip end of the balancer via the support member.

In the thirteenth robot according to any one of the first to twelfth robots, the balancer has a cover member that covers the balancer.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot comprising:
   a stage unit;
   a rotation base connected to the stage unit in a rotatable manner around a rotating axis;
   an arm unit connected to the rotation base and having a base end rotatable around a first rotation axis that is substantially orthogonal to the rotating axis, the first rotation axis being not overlapped with the stage unit viewed from a first direction of the rotating axis;
   a first attachment unit provided to an outer periphery of the rotation base so that one part of a balancer is attached thereto, the first attachment unit being positioned nearer the stage unit than the first rotation axis; and
   a second attachment unit provided to the arm unit so that another part of the balancer is attached thereto.

2. The robot according to claim 1,
   wherein the arm unit has
   a first arm connected to the rotation base, and
   a second arm provided to the first arm in a rotatable manner around a second rotation axis that is substantially parallel to the first rotation axis and extending in a second direction substantially orthogonal to the first direction, and wherein the first attachment unit is positioned in the second direction.

3. The robot according to claim 1 further comprising the balancer,
wherein a first end of the balancer is attached to the first attachment unit in a rotatable manner around a first support axis that is substantially parallel to the first rotation axis, and
wherein a second end of the balancer is attached to the second attachment unit in a rotatable manner around a second support axis that is substantially parallel to the first rotation axis.

4. The robot according to claim 2 further comprising:
a swing unit connected to the second arm in a rotatable manner around a third rotation axis that is substantially parallel to the first rotation axis;
a flange unit rotatable around a fourth rotation axis that is substantially orthogonal to the third rotation axis;
an end effector attachment unit provided to the flange unit; and
an end effector attached to the end effector attachment unit.

5. The robot according to claim 4, wherein the end effector is a spot welding gun.

6. The robot according to claim 1, wherein the balancer has a cylinder unit filled with fluid and a rod unit expanded and contracted by a pressure of the fluid.

7. The robot according to claim 3, wherein the balancer has a cylinder unit filled with fluid and a rod unit expanded and contracted by a pressure of the fluid.

8. The robot according to claim 3,
wherein the stage unit, the first support axis, and the first rotation axis are placed in this order in the first direction, and
wherein the stage unit, the first rotation axis, and the first support axis are placed in this order in the second direction.

9. The robot according to claim 8,
wherein the rotation base has a connection unit that accommodates a reduction gear so that the reduction gear is connected to the arm unit in a rotatable manner,
wherein the connection unit supports a servo motor adapted to apply a rotary driving force to the arm unit, and
wherein the servo motor is connected to the reduction gear accommodated in the connection unit so as to be able to transfer motive power to the reduction gear.

10. The robot according to claim 9 further comprising a first cable connected to the servo motor, wherein a hole, into which the first cable is inserted, is provided on the connection unit.

11. The robot according to claim 10 further comprising a second cable,
wherein the stage unit and the rotation base are connected via a rotation member having a hollow hole along the rotating axis,
wherein the first cable and the second cable are routed through the hollow hole and from the stage unit to an upper part of the rotation base and branched at the upper part of the rotation base,
wherein the first cable from the upper part of the rotation base is connected to the servo motor, and
wherein the second cable from the upper part of the rotation base is routed along the balancer.

12. The robot according to claim 11, wherein the second cable is arranged along the arm unit outside the balancer while supported by the balancer.

13. The robot according to claim 11 further comprising a support member, wherein the second cable is supported to a tip end of the balancer via the support member.

14. The robot according to claim 1, wherein the balancer has a cover member that covers the balancer.

15. The robot according to claim 3, wherein the balancer has a cover member that covers the balancer.

16. A robot comprising:
a stage unit;
a rotation base connected to the stage unit in a rotatable manner around a rotating axis;
an arm unit connected to the rotation base and having a base end rotatable around a first rotation axis that is substantially orthogonal to the rotating axis, the first rotation axis being not overlapped with the stage unit viewed from a first direction of the rotating axis;
a balancer attached to the arm unit;
a first attachment unit provided to an outer periphery of the rotation base so that one part of a balancer is attached thereto, the first attachment unit being positioned nearer the stage unit than the first rotation axis; and
a second attachment unit provided to the arm unit so that another part of the balancer is attached thereto.

* * * * *